July 22, 1969 R. A. WILLIAMS 3,456,534
CENTERING TOOL
Filed Dec. 5, 1968 2 Sheets-Sheet 2
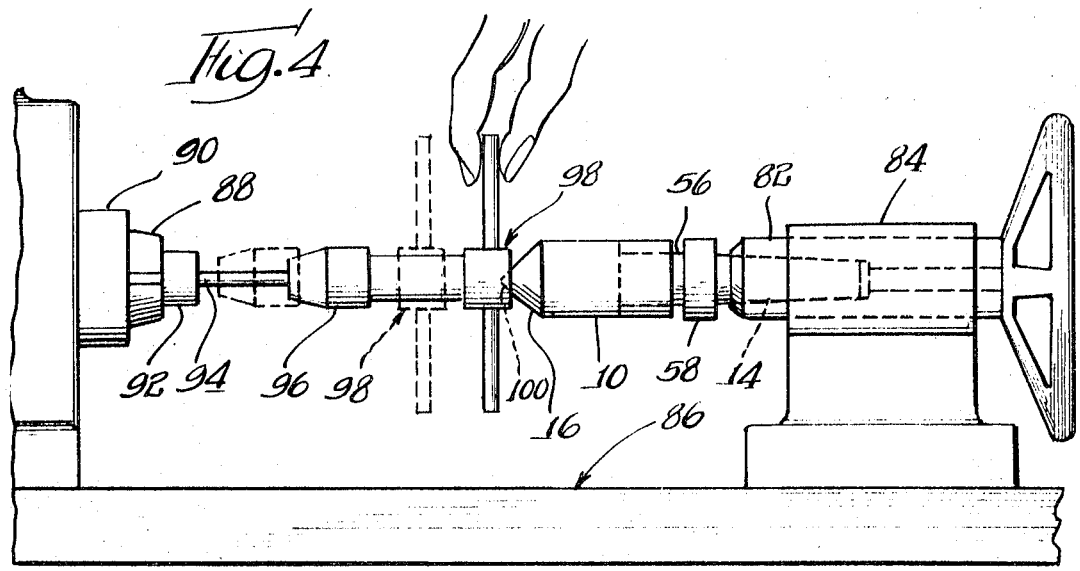
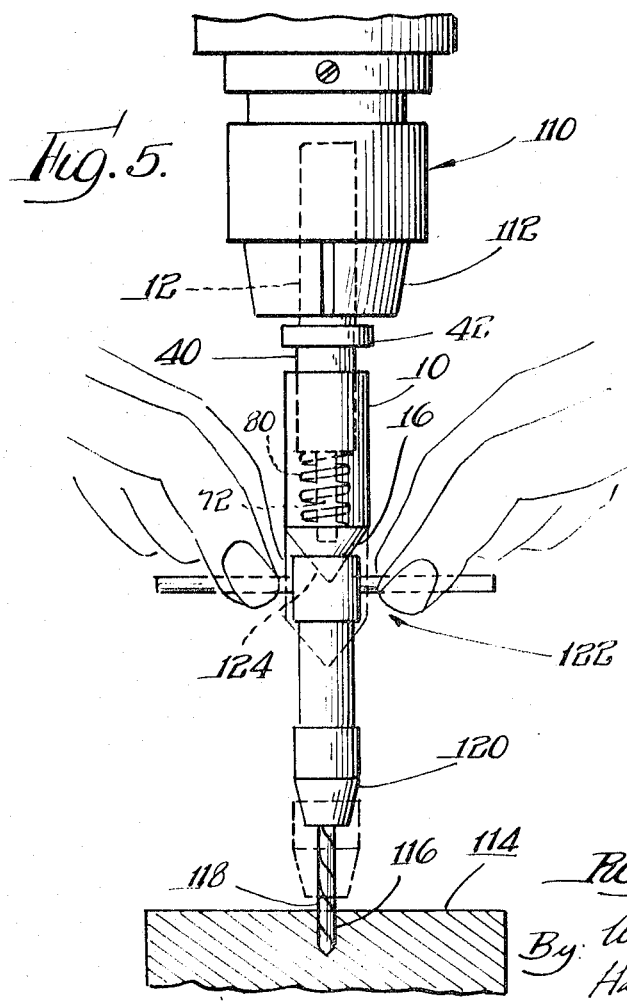
Inventor
Roger A. Williams United States Patent Office 3,456,534
Patented July 22, 1969

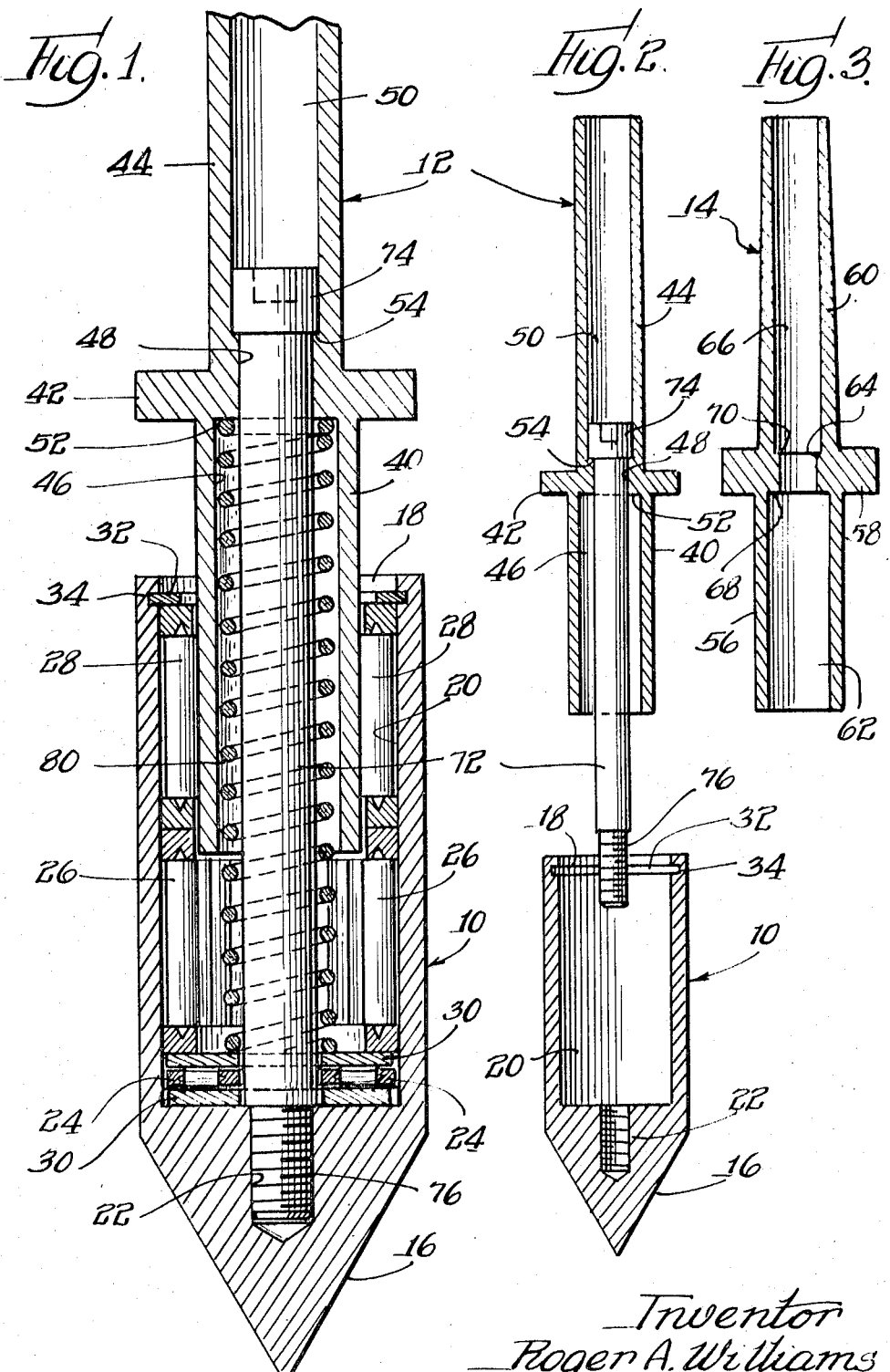

3,456,534
CENTERING TOOL
Roger A. Williams, Chicago, Ill.
(1612 Mariposa Ave., Richmond, Calif. 94804)
Filed Dec. 5, 1966, Ser. No. 599,223
Int. Cl. B23b 23/04
U.S. Cl. 82—33                                    7 Claims

ABSTRACT OF THE DISCLOSURE

A centering tool adaptable for use both as a live center for a lathe, and as a dead center for a lathe or drill press. The tool comprises a head portion and an adapter. The head portion is provided with a longitudinally extending internal bore which communicates at one end with the opening in the head portion. At its other end, the internal bore communicates with a coaxial threaded bore, of smaller diameter, at the tapered tip of the head portion. Positioned within the internal bore of the head portion are anti-friction means desirably including a thrust bearing and needle bearing assemblies. The cooperating adapter of the centering tool is open-ended and has a longitudinal bore of varying diameter extending its entire length. The adapter is provided with a cylindrical end portion for insertion into the internal bore of the head portion through the open end thereof. In one of its forms the adapter has a cylindrical drill press machine part engaging end portion and in another of its forms the adapter has a tapered lathe machine part engaging end portion. The adapter in each of its forms is provided with an outwardly extending collar or flange intermediate the end portions thereof. The head portion and the adapter of the centering tool are releasably engaged with one another by a bolt or pin which at one end has an enlarged head for engaging shoulder means in the adapter and at its other end is provided with a threaded portion to enable it to be engaged with the threaded bore of the head portion. A compression spring, which extends into the internal bore of the head portion and into the bore of the cylindrical end portion of the adapter, is provided for the centering tool for normally maintaining the open end of the head portion in spaced apart relation with respect to the annular flange of the adapter when the head portion and the adapter are secured in position by the bolt or pin. This arrangement enables the head portion, when in a retracted position in opposition to the spring, to move longitudinally relative to a workpiece when the adapter is engaged in the machine part of a lathe or drill press.

The present invention relates to a centering tool adaptable for use both as a live center for a lathe, and as a dead center for a lathe or drill press.

Live centers as well as dead centers for use in connection with lathes or drill presses have long been known. Such prior art devices, exemplified by the lathe centers disclosed in U.S. Patents 2,536,687 and 3,025,735, are limited to use solely as a live or dead tail center for a lathe, or, as disclosed in U.S. Patent 2,286,088, as a dead center for use in a drill press. However, no centering tool heretofore has been developed which is effectively adaptable for use both as a live tail center for a lathe, and as a dead center for a lathe or drill press for holding a tapping tool aligned with a bore to be tapped in a workpiece positioned on the lathe or drill press. The advantages of an effective centering tool, having this versatility, over prior art centers are manifest both, for instance, from an economic standpoint in that only one tool is needed to enable a machinist to perform the aforementioned operations whereas two relatively complex and expensive tools were required before, and further, from the standpoint of efficiency in that a machinist is able, with one tool, to adapt it easily and quickly for use either with a machine part of a lathe or a drill press whereas two separate and completely different tools were needed before.

In accordance with the present invention, there is provided a uniquely versatile centering tool which is provided with means capable, when in contact with a workpiece mounted on a lathe, of rotatable as well as longitudinal movement with relation to the workpiece without binding or galling. Said means of the centering tool of this invention further is capable, when engaged with the center tip-receiving socket of a tapping tool, of moving longitudinally with relation to a workpiece secured in a machine part of a lathe or drill press while continuously maintaining the tapping tool axially aligned with a bore being tapped in the workpiece. Whether acting as a live center for a lathe, or as a dead center for a lathe or drill press, the centering tool of the present invention enables precise and accurate results to be attained with minimal effort on the part of the operator. The tool, while having the versatility noted, is relatively inexpensive to manufacture and is simple to use. Its adaptability for simple and effective use in connection with both a lathe and drill press, of course, is an important economic consideration to manufacturers as well as machinists.

Briefly, the preferred embodiment of the centering tool of the present invention comprises a head portion and an adapter. The head portion has a tapered centering tip at one end an an opening at its other end. The head portion is provided with a longitudinally extending internal bore which communicates at one end with the opening in the head portion. At its other end, the internal bore communicates with a coaxial threaded bore, of smaller diameter, at the tapered tip of the head portion. Positioned within the internal bore of the head portion are anti-friction means desirably including a thrust bearing and needle bearing assemblies. The cooperating adapter of the centering tool is open-ended and has a longitudinal bore of varying diameter extending its entire length. The adapter is provided with a cylindrical end portion for insertion into the internal bore of the head portion through the open end thereof. In one of its forms the adapter has a cylindrical drill press machine part engaging end portion and in another of its forms the adapter has a tapered lathe machine part engaging end portion. The adapter in each of its forms is provided with an outwardly extending collar or flange intermediate the end portions thereof. The head portion and the adapter of the centering tool are releasably engaged with one another by a bolt or pin which at one end has an enlarged head for engaging shoulder means in the adapter and at its other end is provided with a threaded portion to enable it to be engaged with the threaded bore of the head portion. A compression spring, which extends into the internal bore of the head portion and into the bore of the cylindrical end portion of the adapter, is provided for the centering tool for normally maintaining the open end of the head portion in spaced apart relation with respect to the annular flange of the adapter when the head portion and the adapter are secured in position by the bolt or pin. This arrangement enables the head portion, when in a retracted position in opposition to the spring, to move longitudinally relative to a workpiece when the adapter is engaged in the machine part of a lathe or drill press.

The foregoing, and other advantages and features of the invention will become apparent upon making reference to the specification to follow, the claims and the drawings wherein:

FIG. 1 is an enlarged fragmentary view partly in section of an embodiment of the centering tool of the present invention;

FIG. 2 is an exploded view, partly in section of the head portion and the form of the adapter for engagement with the machine part of a drill press;

FIG. 3 is a sectional view of the form of the adapter for engagement with a machine part of a lathe;

FIG. 4 is a side view in elevation of said embodiment being used as a dead center for holding a tapping tool aligned with a bore to be tapped in a workpiece mounted on a lathe; and FIG. 5 is a side view in elevation of said embodiment being used as a dead center for holding a tapping tool aligned with a bore to be tapped in a workpiece mounted on a drill press.

Referring now in particular to FIGS. 1–3 of the drawings, the preferred embodiment of the centering tool of this invention illustrated comprises a head portion 10 and a pair of cooperating adapters 12 and 14. The head portion 10 has a tapered tip 16 at one end, and an opening 18 at its other end. Extending longitudinally of the head portion 10 is an internal bore 20 which at one end communicates with the opening 18 in the head portion. Communicating with the other end of the bore 20 and coaxial with it is a threaded bore 22.

Positioned within the bore 20 of the head portion 10 are anti-friction means which advantageously includes a thrust bearing 24, and an inner needle bearing assembly 26 and an outer needle bearing assembly 28. The thrust bearing 24 advantageously is sandwiched between a pair of thrust bearing washers 30—30. The thrust bearing 24 and the needle bearing assemblies 26 and 28 are held in position in the internal bore 20 by a snap ring 32 which is engaged in an annular recess 34 provided in the inner side wall of the head portion 10.

The adapter 12 of the centering tool of the present invention comprises an open-ended cylindrical end portion 40 joined to an intermediate annular collar or outwardly extending flange portion 42 which, in turn, is joined to an open-ended cylindrical drill press machine part engaging end portion 44. The cylindrical end portion 40 of the adapter 12 has a longitudinally extending internal bore 46 which communicates through a short counterbore 48 with a longitudinally extending internal counterbore 50 in the drill press machine part engaging end portion 44. The bores 46, 48 and 50 of the adapter 12 are coaxial and form a shoulder 52 and a shoulder 54 internally of the adapter 12.

The adapter 14 of the centering tool of this invention is like the adapter 12 in that it has an open-ended cylindrical end portion 56 joined to an intermediate annular collar or outwardly extending flange portion 58. The adapter 14 differs from the adapter 12 in that it has an open-ended tapered lathe machine part engaging end portion 60 joined to the flange portion 58. Like the cylindrical end portion 40 of the adapter 12, the corresponding end portion 56 of the adapter 14 has a longitudinally extending internal bore 62 which communicates through a short counterbore 64 with a longitudinally extending internal counterbore 66 in the tapered lathe machine part engaging end portion 60. Also like the adapter 12, the bores 62, 64 and 66 of the adapter 14 are coaxial and form a shoulder 68 and a shoulder 70 internally of the adapter 14.

The cylindrical end portions 40 and 56, respectively, of the adapters 12 and 14 are adapted to be received in the internal bore 20 of the head portion 10, and each adapter advantageously is secured on the head portion 10 by a bolt or pin 72 having a slotted head 74 for engaging the shoulder 54 or the shoulder 70 of the adapters, and an externally threaded end portion 76 for engagement with the threaded bore 22 in the head portion 10. The bolt or pin 72 is of sufficient length to enable a compression spring 80 to yieldingly maintain the flange portion of the adapters in spaced apart relation with respect to the open end of the head portion 10. The spring 80, as illustrated in FIG. 1, extends from the internal bore 46 of the cylindrical end portion 40 of the adapter 12 into the internal bore 20 of the head portion 10. One end of the spring 80 abuts the shoulder 52 while the other end thereof engages the washer 30 positioned on the thrust bearing 24. A similar arrangement would apply with respect to the adapter 14, of course.

As indicated hereinabove, the centering tool of the present invention is uniquely adaptable for use as a live center for a lathe and as a dead center for a lathe or drill press for continuously holding a tapping tool accurately aligned with a bore to be tapped in a workpiece. The latter uses of the centering tool are illustrated in FIGS. 4 and 5 of the drawing.

In FIG. 4, the centering tool comprises the head portion 10 and the tapered adapter 14. The tapered end 60 of the adapter 14 has a standard Morris taper and is adapted to be engaged in the tail spindle 82, or chuck, of a conventional adjustable tailstock structure 84 of a lathe 86. Mounted in the spindle 88 of the headstock 90 of the lathe is a workpiece 92 having a bore which is to be tapped by a tapping bit 94 secured in the spindle 96 of a conventional hand manipulated tapping tool 98. The tool 98 has a socket 100 which receives the end of the tapered tip 16 of the head portion 10. As shown, tapping of the bore in the workpiece 92 is initiated with the head portion 10 being in a retracted position against the opposition of the spring 80. As the tapping tool 98 is turned by hand, the head portion 10 will follow the tool and hold it in axial alignment with the bore in the workpiece.

In FIG. 5, the centering tool is shown in use as a dead center in connection with a drill press 110. The centering tool comprises the head portion 10 and the adapter 12. The cylindrical drill press machine part engaging end portion 44 of the adapter 12 is engaged in the spindle or chuck 112 of the drill press 110. A workpiece 114 is secured on the table (not shown) of the drill press 110 beneath the spindle or chuck 112. The workpiece 114 has a bore 116 which is to be tapped by a tapping bit 118 secured in the spindle 120 of a conventional hand manipulated tapping tool 122. The tool 122 has a socket 124 which receives the end of the tapered tip 16 of the head portion 10 of the centering tool. Tapping of the bore 116 is initiated with the head portion 10 being in a retracted position against the opposition of the spring 80. As the tapping tool 122 is turned by hand, the head portion 10 will follow the tool under the action of the spring 80, and hold it in axial alignment with the bore 116. This arrangement enables a number of bores in the workpiece to be readily and accurately tapped with minimal effort. The retractability feature of the head portion 10 of the centering tool enables bores of a wide variety of depths to be tapped. In the preferred embodiment of the invention shown, tappings up to ⅞ inch in depth can be made without adjusting the drill press or tailstock of a lathe.

When used as a live center in a lathe, the centering tool of this invention not only can rotate with respect to the workpiece but can move longitudinally in relation to it thereby enabling it to compensate for any expansion due to friction at high pressures. This feature enables highly accurate results to be attained with the tool.

While, for purposes of illustration, a preferred embodiment of the present invention has been described, various modifications in the invention will suggest themselves to those skilled in the art in the light of this disclosure and, therefore, the invention is to be limited only by the scope of the appended claims.

What is claimed is:

1. A centering tool adaptable for use as a live center for a lathe and as a dead center for a lathe or drill press for holding a tapping tool aligned with a bore to be tapped in a workpiece, comprising a head portion having a tapered centering tip at one end thereof and an opening at the other end thereof, said head portion having a longitudinally extending internal bore therein which at one end communicates with the opening at said one end of the head portion and a threaded bore which is coaxial with said internal bore and communicates with the other end thereof, an open-ended adapter for the head portion, said adapter having a cylindrical end portion for insertion into the internal bore of the head portion through the open end thereof and a machine part engaging end portion, each of said end portions of the adapter having a longitudinal internal bore therein, said bores being coaxial and in communication with one another, said adapter further having an outwardly extending annular flange intermediate said end portions thereof, an elongated pin for releasably securing the adapter on the head portion through the internal bores in the end portions of the adapter, said pin having a threaded end portion for engaging the threaded bore in the head portion and retaining means at the other end thereof for engaging the adapter, biasing means extending into the internal bore of the head portion and the bore of the cylindrical end portion of the adapter for normally maintaining the open end of the head portion in spaced apart relation with respect to the annular flange of the adapter when the head portion and the adapter are secured in position by said pin, and anti-friction means in the internal bore of the head portion including bearing means for engaging the cylindrical end portion of the adapter when the head portion and the adapter are secured in position by the pin.

2. A centering tool as claimed in claim 1 wherein the length of said pin is sufficient to enable the head portion to be retracted an appreciable distance in the direction of the flange of the adapter against the opposition of said biasing means.

3. A centering tool as claimed in claim 1 wherein separate shoulder means are provided in said adapter for engagement with the biasing means and the retaining means of said pin.

4. A centering tool as claimed in claim 1 wherein the anti-friction means includes a thrust bearing and an inner and an outer needle bearing assembly positioned along the periphery of the internal bore of the head portion.

5. A centering tool as claimed in claim 1 wherein the flange of the adapter extends outwardly a distance sufficient to enable it to engage the open end of the head portion when the head portion is fully retracted against the opposition of the biasing means.

6. A centering tool as claimed in claim 1 wherein the said machine part engaging end portion of the adapter is cylindrical to enable it to be engaged in the spindle of a drill press.

7. A centering tool as claimed in claim 1 wherein the said machine part engaging end portion of the adapter is tapered to enable it to be engaged in the tail spindle of a lathe.

References Cited

UNITED STATES PATENTS

| 1,742,451 | 1/1930 | Schnelle | 82—33 |
| 2,463,385 | 3/1949 | Holohan | 82—33 |

LEONIDAS VLACHOS, Primary Examiner

U.S. Cl. X.R.

10—135